350-270

SEARCH ROOM

T2572

Feb. 13, 1962 W. A. GODDARD 3,020,805

OPTICAL RECORDING DEVICE

Filed March 27, 1958

INVENTOR.
WILLIAM A. GODDARD

BY John B. Aponsler
AGENT

United States Patent Office 3,020,805

Patented Feb. 13, 1962

3,020,805

OPTICAL RECORDING DEVICE

William A. Goddard, Monte Sereno, Calif., assignor to International Business Machines Corporation, New York, N.Y., a corporation of New York Filed Mar. 27, 1958, Ser. No. 724,390
2 Claims. (Cl. 88—61)

This invention relates to a recording device and more particularly to a control element for rapidly recording coded characters upon a photographic medium.

In high speed data processing machines, it is necessary to record and store vast amounts of information for current and future reference. In addition to magnetic means, such as tapes, discs, drums, and cores, photographic media have also been employed for this data storage purpose. With photographic storage devices, as with the magnetic "memories," the data recorded has been comprised of various combinations of discrete spots or bits, each combination representing an alphanumeric character. In order to store a maximum amount of data in a minimum area of photographic film, the bits must be accurately and closely spaced without loss of identity. Furthermore, it is to be appreciated that the recording of a number of characters must be done very rapidly in order that the recording means keep up with electronic control inputs thereto. A crucial element of any such photomemory system, then, is the control element for rapidly placing and spacing a number of coded characters upon the film employed.

Therefore, it is an object of this invention to provide a photorecording control element which can rapidly expose a plurality of coded characters upon a photographic film.

It is another object of this invention to provide a photorecording control element which is easily adaptable to provide an optically reduced record.

Another object of this invention is to provide a photorecording control element of simplified construction having a minimum of moving parts.

Other objects of the invention will be pointed out in the following description and claims and illustrated in the accompanying drawing which disclosed, by way of example, the principle of the invention and the best mode which has been contemplated of applying that principle.

Figures 1, 2:
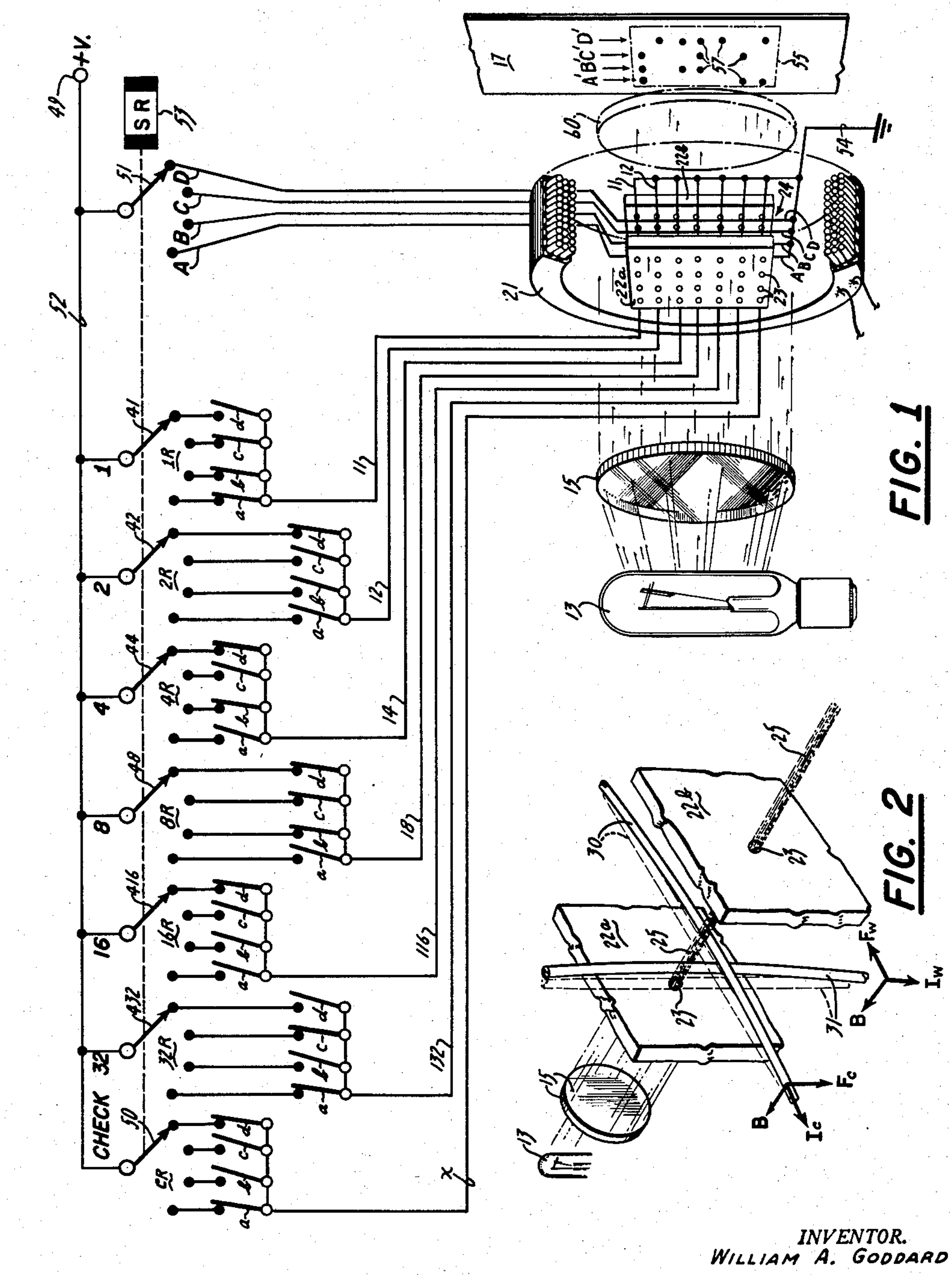
FIG. 1 is a schematic view of the invention in perspective.
FIG. 2 is a perspective view of an enlarged portion of the invention of FIG. 1 showing the principle of operation of the invention.

Briefly stated, the invention comprises two groups of parallel and spaced apart conductors, one group being disposed preferably at right angles to the other to form a matrix. Each conductor is free to move normal to its length. A mask is provided having a number of small holes drilled therethrough arranged in columns and rows. Each conductor overlies one of the columns or one of the rows so that each hole is positioned at the intersection of two perpendicular conductors. Either of the conductors is large enough in diameter to block the passage of light therethrough. A magnetic field is provided mutually perpendicular to both groups of conductors so that a current applied to any conductor will cause it to be displaced, in accordance with Ampere's left-hand rule for motor action, from in front of its associated column or row of holes. Since each hole is obstructed by two intersecting conductors, current applied to the matrix can be used to control the passage of light through selected combinations of the holes. Setting up a character in code may be effected by placing a current on a predetermined seletcion of the wires of one group, and maintaining this current while energizing one of the conductors of the other group, thereby allowing light to pass through all of the selected holes, i.e., those holes located adjacent the intersection of two current carrying conductors.

Although U.S. Letters Patent 1,617,241 shows a single wire controlling a single aperture to modulate the passage of light therethrough in a radiotelescope, the invention herein is typified by the provision of intersecting conductors as described above for properly controlling the photorecording of discrete data bits upon a photoresponsive medium.

Referring to FIGS. 1 and 2, there is provided a light source 13, a collimator 15 for projecting parallel light rays upon a film 17 through holes 23 located in a pair of soft iron masks 22*a* and 22*b*. Masks 22 are encircled by a coil 21 which provides a magnetic flux substantially normal to the surface of masks 22. Masks 22, being of soft iron tend to concentrate the flux therebetween. Although only one mask is necessary, the use of two is preferred in order to place the flux more substantially normal thereto. It will, of course, be obvious that a pair of masks having permanently magnetized adjacent faces can be substituted for coil 21. Holes 23 are aranged in a number of columns and rows so that the holes in one mask 22 are aligned with the holes in the other mask to define a light path 25 therethrough. The two masks 22*a* and 22*b* are spaced apart so as to provide room for the positioning of a matrix 24 of conductors therebetween.

Matrix 24 is formed from the intersections of horizontal conductors 11, 12, 14, 18, 116, 132 and *x* which are spaced parallel to each other between masks 22*a* and 22*b*, with a plurality of column control wires A, B, C and D also parallel between masks 22*a* and 22*b*. Each intersection of a column control wire A–D with a horizontal conductor is located adjacent one of holes 23 so as to interrupt its associated light path 25. It is to be understood that an "intersection" as the term is used herein includes the projection of one conductor upon the other and is therefore not limited to a physical contact between wire and conductor.

As best shown in FIG. 2, with a conductor 30 placed mutually perpendicular to a wire 31 and the direction of a magnetic flux designated by the arrow B, the application of current $I_c$ to conductor 30, as shown, will cause it to be displaced downwardly as designated by the arrow $F_c$. Likewise, a current $I_w$ downwardly on wire 31 will move wire 31 in the direction of arrow $F_w$.

For data recording purposes, it is preferred that wires A–D and conductors 11, 12, etc. all have a sufficiently large diameter so that any one of them will prevent any light from passing through holes 23. However, it will be apparent that varying amounts of light may be passed through holes 23 by reducing the wire or conductor size with respect to the hole. For example, an electronic circuit employing a photomultiplier could be arranged so as to be responsive to two different levels of light, i.e., a first level generated by removal of one conductor from the light path 25 and a second level created by displacement of a second conductor therefrom. Further, it is possible without departing from the invention to control the degree of displacement of each conductor by varying the current thereon and in this manner control the light passing via holes 23.

Seven registers 1R, 2R, 4R, 8R, 16R, 32R, and CR have been provided which control conductors 11, 12, 14, 18, 116, 132 and *x* respectively. Six of these registers represent orders in the binary code, for example, register 1R represents the number one, 2R represents a two, 4R a four, 8R an eight, 16R a sixteen and 32R a thirty-two. Combinations of these orders represent one character. For example, combining a pulse from register 1R with a pulse from register 4R represents a five. The seventh register CR provides an additional bit or "check" bit whenever the number of bits from the six other registers is an even number. This insures that all characters will be comprised of an odd number of bits, and in this manner an "odd-count" code is produced which facilitates checking the accuracy of recording.

Each register is comprised of four storage devices such as latch type relays or other known storage devices represented here, in a form conventional to those skilled in the art for illustrating storage devices in simplified fashion, as switches *a*, *b*, *c*, and *d*. It is to be understood, however, that the arrangement shown is only schematic and that other memory devices, such as Schmitt triggers, can be substituted for the switches shown, *a–d*, to provide a storage of information therein. Switches *a–d* of each register are to be independently controlled, as by suitable computer circuitry (not shown). Switches *a*, *b*, *c* and *d* of each register 1R, 2R, 4R, etc. are arranged to be scanned sequentially by an associated commutator 41, 42, 44, 48, 416, 432 and 50 respectively. All commutators for registers 1R, 2R, 4R, etc. are ganged together to scan all the "*a*" switches at the same time, then all the "*b*'s," then the "*c*" switches, and finally all the "*d*" switches. Thus, by closing a combination of the "*a*" switches, for example, a selection from among conductors 11, 12, 14, etc. is made. Similarly, combinations of the "*b*," "*c*" or "*d*" switches will select various conductors. The passage of current through these selected conductors will displace them in accordance with Ampere's law as explained above from their associated rows of holes 23.

A column control commutator 51 is also provided which sequentially connects column control wires A, B, C and D to a voltage source 49, preferably D.C. Commutator 51 is also ganged with the register commutators 41, 42, 44, etc. so that wire A will be energized during the scanning of switches "*a*," B with switches "*b*," etc. A step relay 53 is shown for stepwise operation of all registers 1R, 2R, etc. and column control commutator 51 in tandem.

Commutator 51 and registers 1R, 2R, 4R, 8R, 16R, 32R and CR are connected in parallel by line 52 leading from voltage source 49. All conductors 11, 12, 14, etc. and all wires A–D are connected to ground via line 54.

The operation of the invention may be understood by referring to FIG. 1 where there is shown a field 55 of four characters which have just been recorded on a photographic film 17. One character has been recorded in each of four columns designated A′, B′, C′ and D′ to correspond to wires A, B, C and D. For example, the character in column A′ is the number "33." To record this number in the A′ column, the "*a*" switch in the one's register 1R and thirty-two's register 32R was closed, in addition to the "*a*" switch in the check register CR, which provided the recorded character with an odd number of bits. All other "*a*" switches were left open. Step relay 53 was actuated to connect each commutator with its associated "*a*" switch as well as commutator 51 with wire A. Closing the "*a*" switch of the one's, thirty-two's and check registers, as shown, energized conductors 11, 132 and *x* to displace them from the holes 23 in their respective rows in masks 22. Simultaneously therewith, current on wire A unblocked a column of associated holes in masks 22. This coincidence of displacement of selected conductors with displacement of wire A allowed light to pass through three selected holes in the leftmost column of masks 22 to expose three discrete spots 57 in column A′ on film 17. These three spots thus represent the number "33." Similarly, the number "13" is photorecorded in column B′. The number "41" is represented by spots 57 in column C′ and the number "30" by those in column D′.

In FIG. 1 there has been shown in phantom lines a simple lens 60 between matrix 24 and film 17 which is representative of any suitable lens system for reducing the relative spacings between spots 57 as by defocusing, and/or for controlling the size of field 55.

Although the invention has been described with respect to the passage of light through masks 22, which usually refers to visible rays, it is not intended to exclude other forms of radiant energy, such as infrared and ultraviolet rays.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

What is claimed is:

1. A photorecording control element for rapidly recording coded characters upon a photoresponsive medium comprising an opaque mask of highly permeable material having a plurality of holes therein defining discrete light paths through said mask to said medium, said holes being disposed in a rectilinear pattern to form a plurality of columns and rows thereof, a plurality of conductors each positioned to overlay an associated one of said rows of holes normally to block the passage of light therethrough, a plurality of conductive wires each positioned to overlay an associated one of said columns of holes normally to block the passage of light therethrough, means for providing a substantially uniform field of magnetic flux in a direction substantially normal to said mask over all of said conductors and said wires, means for applying electric currents concurrently and selectively to one of said wires and to said conductors to displace said selected wire from the associated column of holes and said selected conductors from the associated rows of holes to pass light to said medium by way of a selected combination of holes in the column thereof associated with said selected wire to transmit coded characters to said medium in the form of said selected combination of holes only upon the concurrent displacement of both the wire and the conductor associated with the selected holes.

2. A photorecording control element for rapidly recording coded characters upon a photoresponsive medium comprising an opaque mask of highly permeable material having a plurality of holes therein defining discrete light paths through said mask to said medium, said holes being disposed in a rectilinear pattern to form a plurality of columns and rows thereof, a plurality of conductors each positioned to overlay an associated one of said rows of holes normally to block the passage of light therethrough, a plurality of conductive wires each positioned to overlay an associated one of said columns of holes normally to block the passage of light therethrough, means for providing a substantially uniform field of magnetic flux in a direction substantially normal to said mask over all of said conductors and said wires, means for applying electric currents concurrently and selectively to said wires, and means to apply electric current selectively to said conductors to displace said selected wires from the associated column of holes and said selected conductors from the associated rows of holes to pass light to said medium by way of a selected combination of said holes only upon the concurrent displacement of both the wires and the conductors associated with the selected holes.

References Cited in the file of this patent

UNITED STATES PATENTS

| | | |
|---|---|---|
| 1,746,729 | Ives | Feb. 11, 1930 |
| 1,753,961 | Zworykin | Apr. 8, 1930 |
| 1,754,491 | Wald | Apr. 15, 1930 |
| 2,042,859 | Nicolson | June 2, 1936 |